United States Patent
Liu et al.

(10) Patent No.: US 11,778,589 B2
(45) Date of Patent: Oct. 3, 2023

(54) GROUP RESOURCE SHARING FOR WIRELESS COMMUNICATION

(71) Applicant: QUALCOMM Incorporated, San Diego, CA (US)

(72) Inventors: Chih-Hao Liu, San Diego, CA (US); Yisheng Xue, San Diego, CA (US); Aleksandar Damnjanovic, Del Mar, CA (US); Jing Sun, San Diego, CA (US); Xiaoxia Zhang, San Diego, CA (US); Rajat Prakash, San Diego, CA (US); Juan Montojo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 17/150,901

(22) Filed: Jan. 15, 2021

(65) Prior Publication Data

US 2022/0232517 A1    Jul. 21, 2022

(51) Int. Cl.
*H04W 72/02* (2009.01)
*H04W 28/26* (2009.01)
*H04W 74/08* (2009.01)
*H04W 72/20* (2023.01)
*H04W 92/18* (2009.01)

(52) U.S. Cl.
CPC ......... *H04W 72/02* (2013.01); *H04W 28/26* (2013.01); *H04W 72/20* (2023.01); *H04W 74/0816* (2013.01); *H04W 92/18* (2013.01)

(58) Field of Classification Search
CPC ..... H04W 72/02; H04W 72/20; H04W 28/26; H04W 74/0816; H04W 92/18
See application file for complete search history.

(56) References Cited

U.S. PATENT DOCUMENTS

2019/0260527 A1* 8/2019 Wu ........................... H04L 5/00
2019/0357231 A1* 11/2019 Gupta ................... H04L 1/1896
(Continued)

FOREIGN PATENT DOCUMENTS

WO    WO-2020164439 A1 *   8/2020    .......... H04L 5/0053

OTHER PUBLICATIONS

WO2020164439A1 Xu—English Translation (Year: 2023).*
International Search Report and Written Opinion—PCT/US2021/063623—ISA/EPO —dated May 13, 2022.

*Primary Examiner* — Chi H Pham
*Assistant Examiner* — Weibin Huang
(74) *Attorney, Agent, or Firm* — Procopio, Cory, Hargreaves & Savitch LLP

(57) ABSTRACT

A first UE in a UE group may determine that a sidelink channel is available for data transmission and transmit SCI reserving a COT on the sidelink channel. A second may receive, from the first UE, the SCI reserving the COT on the sidelink channel and transmitting the sidelink transmission on the sidelink channel using one or more resources of the inter-group sharable resources. The COT may include a first set of resources reserved for the first UE, an intra-group sharable resources capable of being shared by the UE group, and an inter-group sharable resources capable of being shared by the second UE outside of the UE group. The second UE may perform the CAT 1 or CAT 2 LBT procedure to contend for the inter-group sharable resources. The access to the inter-group sharable resources may be limited.

58 Claims, 10 Drawing Sheets

(56) References Cited

U.S. PATENT DOCUMENTS

| | | | |
|---|---|---|---|
| 2020/0037343 A1* | 1/2020 | He | H04W 28/0268 |
| 2020/0186290 A1* | 6/2020 | Zhang | H04L 1/0073 |
| 2020/0260463 A1* | 8/2020 | Lovlekar | H04W 36/03 |
| 2020/0305174 A1* | 9/2020 | Ganesan | H04W 4/029 |
| 2021/0368351 A1* | 11/2021 | Cui | H04W 74/002 |
| 2022/0240260 A1* | 7/2022 | Zhou | H04W 72/02 |

* cited by examiner

GROUP RESOURCE SHARING FOR WIRELESS COMMUNICATION

BACKGROUND

Technical Field

The present disclosure generally relates to communication systems, and more particularly, to group time/frequency resource sharing for wireless communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a first user equipment (UE) included in a UE group and a second UE outside of the UE group. The first UE may determine that a sidelink channel is available for data transmission and transmit sidelink control information (SCI) reserving a channel occupancy time (COT) on the sidelink channel in response to determining that the sidelink channel is available for data transmission. The COT may include a first set of resources reserved for the first UE for sidelink data transmission on the sidelink channel, a second set of resources as an intra-group sharable resources capable of being shared by a UE group including the first UE for sidelink transmission on the sidelink channel, and a third set of resources as an inter-group sharable resources capable of being shared by the second UE outside of the UE group for the sidelink transmission on the sidelink channel.

The first UE may determine that the sidelink channel is available for the data transmission based on a listen-before-talk (LBT) procedure. The first UE may determine that the sidelink channel is available for the data transmission by performing a category (CAT) 4 LBT procedure.

The inter-group sharable resources may be reserved for sharing with the second UE outside of the UE group. The SCI may indicate the inter-group sharable resources of the COT on the sidelink channel that are capable of being shared by the second UE outside of the UE group.

The inter-group sharable resources may overlap in time with the first set of resources, and the inter-group sharable resources may include resources that do not overlap in time with the first set of resources.

A first UE within the UE group may contend for the intra-group sharable resources based on a first type of LBT procedure and a second UE outside the UE group may contend for the intra-group sharable resources based on a second type of LBT procedure, where the first type of LBT procedure may include a CAT 1 or CAT 2 LBT procedure and the second type of LBT procedure may include a CAT 4 LBT procedure.

The SCI may indicate the first set of resources and the intra-group sharable resources of the COT on the sidelink channel, where the inter-group sharable resources may include remaining resources of the COT. The SCI may indicate a priority threshold value for use of the inter-group sharable resources by the second UE outside of the UE group. The SCI may indicate a packet delay budget (PDB) threshold value for use of the inter-group sharable resources by the second UE outside of the UE group. The SCI may include a group identifier (ID) identifying the UE group. The SCI may include a field that may indicate whether inter-group sharing is allowed. The SCI may include a list of one or more group IDs for additional UE groups for inter-group sharing of the inter-group sharable resources.

The first UE may monitor for sidelink transmissions in the intra-group sharable resources of the COT, compute a usage ratio of resources of the intra-group sharable resources reserved for the UE group on the sidelink channel, and adjust a size of the intra-group sharable resources in an additional COT based on the usage ratio. The size of the intra-group sharable resources may be adjusted by increasing the size of the intra-group sharable resources in response to the computed usage ratio being greater than or equal to a usage threshold value, or decreasing the size of the intra-group sharable resources in response to the computed usage ratio being smaller than a usage threshold value.

The second UE may receive, from the first UE, the SCI reserving the COT on the sidelink channel, the COT including the intra-group sharable resources capable of being shared by the UE group that includes the first UE and does not include the second UE, and the inter-group sharable resources capable of being shared by the UE outside of the UE group for sidelink transmissions on the sidelink channel, and transmitting a sidelink transmission on the sidelink channel using one or more resources of the inter-group sharable resources.

The second UE may perform an LBT procedure before transmitting the sidelink transmission on the sidelink channel using the one or more resources of the intra-group sharable resources or the inter-group sharable resources. The second UE may contend for the intra-group sharable resources based on a different type of LBT procedure than the UE group uses to contend for the intra-group sharable resources. The second UE may also contend for the inter-group sharable resources based on the same type of LBT procedure as the UE group uses to contend for the intra-group sharable resources.

When the SCI indicates a priority threshold value, the second UE may transmit the sidelink transmission on the sidelink channel using the one or more resources of the inter-group sharable resources based on a priority of the sidelink transmission meeting the priority threshold value. When the SCI indicates a PDB threshold value, the second UE may transmit the sidelink transmission on the sidelink channel using the one or more resources of the inter-group sharable resources based on a PDB at the second UE meeting the PDB threshold value. When the SCI includes a list of one or more group IDs for additional UE groups for inter-group sharing of the inter-group sharable resources, the second UE may transmit the sidelink transmission on the sidelink channel using the one or more resources of the inter-group sharable resources based on the second UE being a part of one of the additional UE groups.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
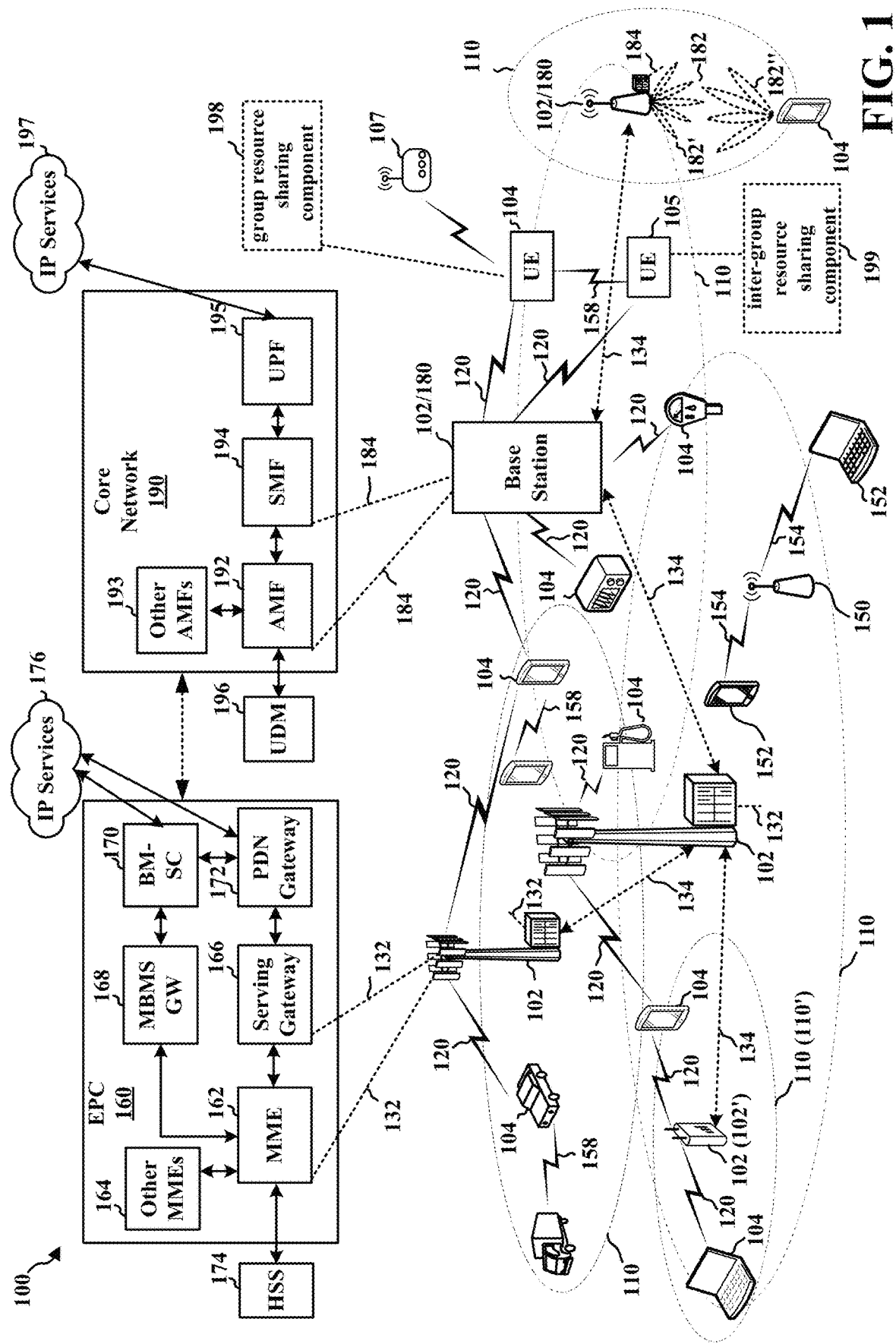
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104 in a UE group, or other device communicating based on sidelink, may include a group resource sharing component 198 configured to determine that a sidelink channel is available for data transmission and transmit SCI reserving a COT on the sidelink channel in response to determining that the sidelink channel is available for data transmission. Referring again to FIG. 1, in certain aspects, a UE 105 outside the UE group, or other device communicating based on sidelink, may include an inter-group resource sharing component 199 configured to may receive, from the first UE, SCI reserving a COT on a sidelink channel, and transmitting a sidelink transmission on the sidelink channel using one or more resources of the inter-group sharable resources. The COT may include a first set of resources reserved for the first UE for sidelink data transmission on the sidelink channel, a second set of resources as an intra-group sharable resources capable of being shared by the UE group including the first UE for sidelink transmission on the sidelink channel, and a third set of resources as an inter-group sharable resources capable of being shared by the second UE outside of the UE group for the sidelink transmission on the sidelink channel. Although the following description may be focused on 5G NR and NR-U sidelink, the concepts described herein may be applicable to other similar areas, such as WiFi 10, LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
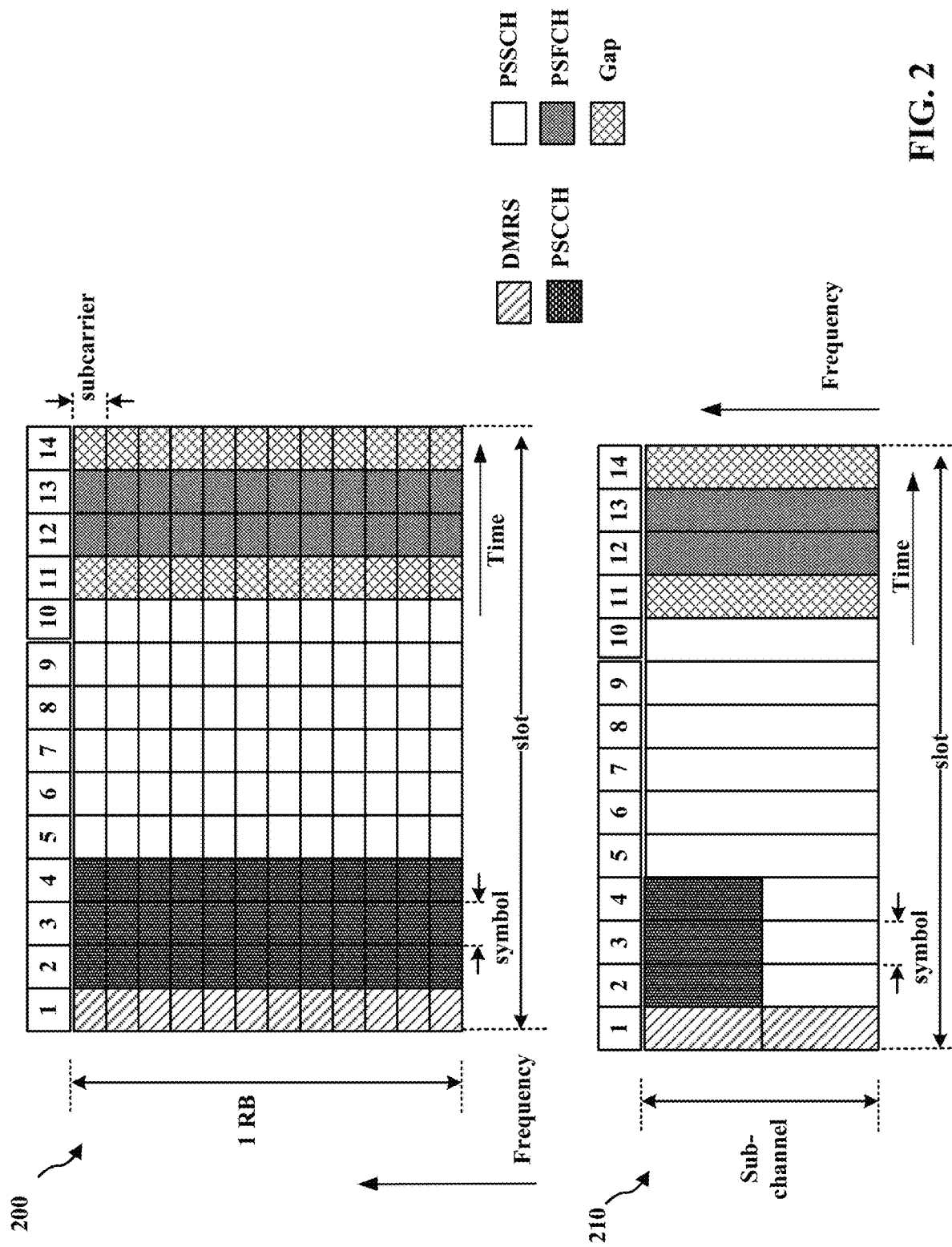
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
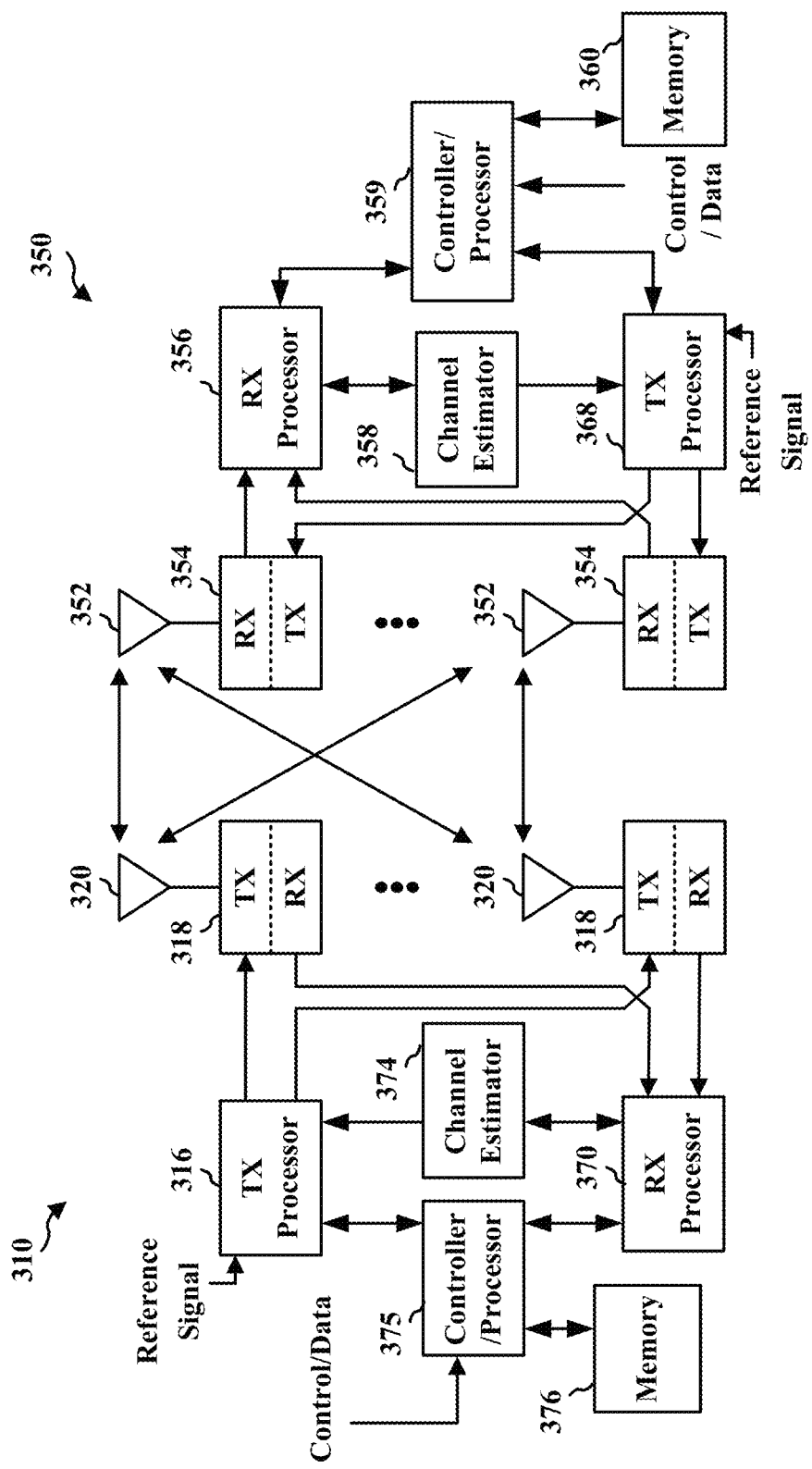
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the group resource sharing component 198 of FIG. 1. At least one of the TX processor 316, the RX processor 370, and the controller/processor 375 may be configured to perform aspects in connection the inter-group resource sharing component 199 of FIG. 1.

Figure 4:
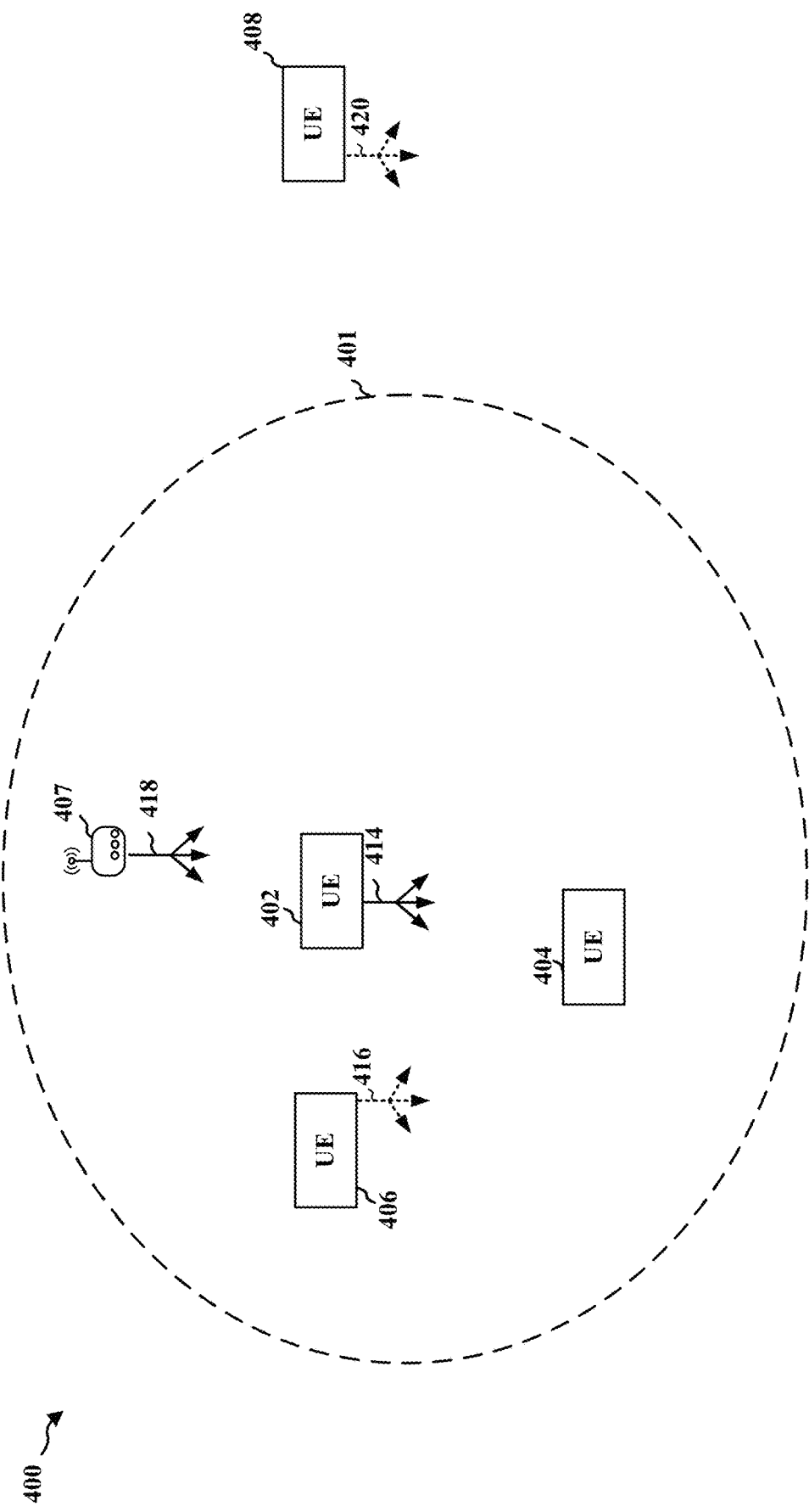
FIG. 4 illustrates an example of wireless communication between devices based on sidelink communication.

FIG. 4 illustrates an example 400 of wireless communication between devices based on sidelink communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each be capable of operating as a transmitting device in addition to operating as a receiving device. Thus, UEs 406, 408 are illustrated as transmitting transmissions 416, 420. The transmissions 414, 416, 420 may be broadcast or multicast to nearby devices. For example, UE 414 may transmit communication intended for receipt by other UEs within a range 401 of UE 414. Additionally/alternatively, RSU 407 may receive communication from and/or transmit the communication 418 to UEs 402, 404, 406, 408.

In some aspects, the sidelink communication may include congestion control algorithms to avoid congestion among various devices and to assist in sharing of resources between the devices. A plurality of sidelink UEs may compete with one another to use the limited amount of time/frequency resources to communicate transmissions. In some examples, sidelink devices may contend with other technologies in order to use wireless resources in the unlicensed spectrum. As an example of a type of sidelink transmissions, eMBB traffic may be transmitted between UEs via NR-U sidelink. Congestion control for sidelink may not provide adequate network performance in case of heavy-loaded or bursty traffic.

In a contention-based sidelink communication, every UE configured to communicate on a sidelink channel may contend for a channel occupancy time (COT) to communicate data transmission. In response to a UE successfully securing the COT to communicate the data transmission, the UE may transmit SCI indicating the time/frequency resources allocated for data transmission by the UE. The UE may communicate the data transmission on the allocated time/frequency resources.

For example, one or more UEs configured to communicate on the sidelink channel may perform a listen-before-talk (LBT) procedure to contend for the COT to communicate data transmission. That is, each sidelink UE with data to transmit on a sidelink channel may perform a clear channel assessment (CCA) procedure to determine whether a channel measurement of the received power is greater than a threshold value in order to determine whether the channel is available for data transmission by the UE. A UE may determine that channel is available if the channel measurement of the received power is lower than a threshold value, and the UE may determine that the sidelink channel is not available for data transmission if the channel measurement is higher than the threshold.

The LBT performed by the plurality of UEs configured to communicate on the sidelink channel may have different categories or types of procedures. For example, a CAT 1 LBT may refer to no LBT, a CAT 2 LBT may refer to an LBT without random backoff, a CAT 3 LBT may refer to an LBT with a random backoff with a fixed-size contention window, and a CAT 4 LBT may refer to an LBT with the random backoff with variable size contention window. The CAT 4 LBT or the CAT 3 LBT may be defined with the random backoff with the contention window to provide less probability of collision with other data transmission. The CAT 1 or CAT 2 LBT may have a better chance to secure the COT and communicate the data transmission, but the UEs may be configured to contend for the COT with the CAT 3 or CAT 4 LBT to reduce the collision of data transmission.

In a dense deployment of sidelink UEs, a heavy collision may occur when all the UEs try to access the shared time/frequency resources. Under the heavy collision, the existing congestion algorithm may collapse and cause long delays and a larger packet error rate (PER).

In some aspects, the sidelink UE may communicate with a limited number of UEs within a particular group of UEs. In one example, a user may be playing an online game with a couple of UEs. In another example, in an industrial application, a group of sensors/actuators controlled by the same programmable logic controller (PLC) may be exclusively communicating within the same group of sensors/actuators. In the case where the limited number of UEs are communicating within the particular group of UEs, the group of sidelink UEs may be configured to share the group time/frequency resources to alleviate the collision problem.

In some aspects, a group of sidelink UEs may be configured to share the group time/frequency resources within the group of sidelink UEs. During the channel contention phase, the plurality of sidelink UEs may individually contend to secure the COT. A first UE group may include a first UE, and the first UE may individually contend to secure the COT. In response to securing the COT, the first UE may share the COT with the other UEs within the first UE group. The first UE may transmit the SCI to indicate the group COT and the UEs that may share the group COT. The UEs included in the UE group and UEs addressed by the SCI may share the group COT and may use at least a portion of the group COT for a sidelink transmission.

A plurality of UEs within the same group may be configured with the same group index to indicate that the plurality of UEs belongs to the same group. The plurality of UEs may configure the group indices indicating in which group each UE is included. The group index may be configured through RRC messages. The SCI may include an explicit group ID to identify the UEs that may share the group COT. The UE that may share the group COT may forward group information to configure the UE group. In other examples, a different UE or device may have configured the UE group. The sidelink UE may be configured with a list of group UE IDs in its UE group. When a UE receives an SCI, the UE may compare the group UE ID list of the UE with the source/destination ID to the group ID list to determine if the received SCI is for the UEs in the same UE group. The UE may determine whether to share the COT based on whether the received SCI is for the UEs in the same UE group.

The group configuration may be decided on an application level. For example, the group configuration may include the UEs within a service group or associated with a service that belongs to a particular operator and/or owner.

Figure 5:
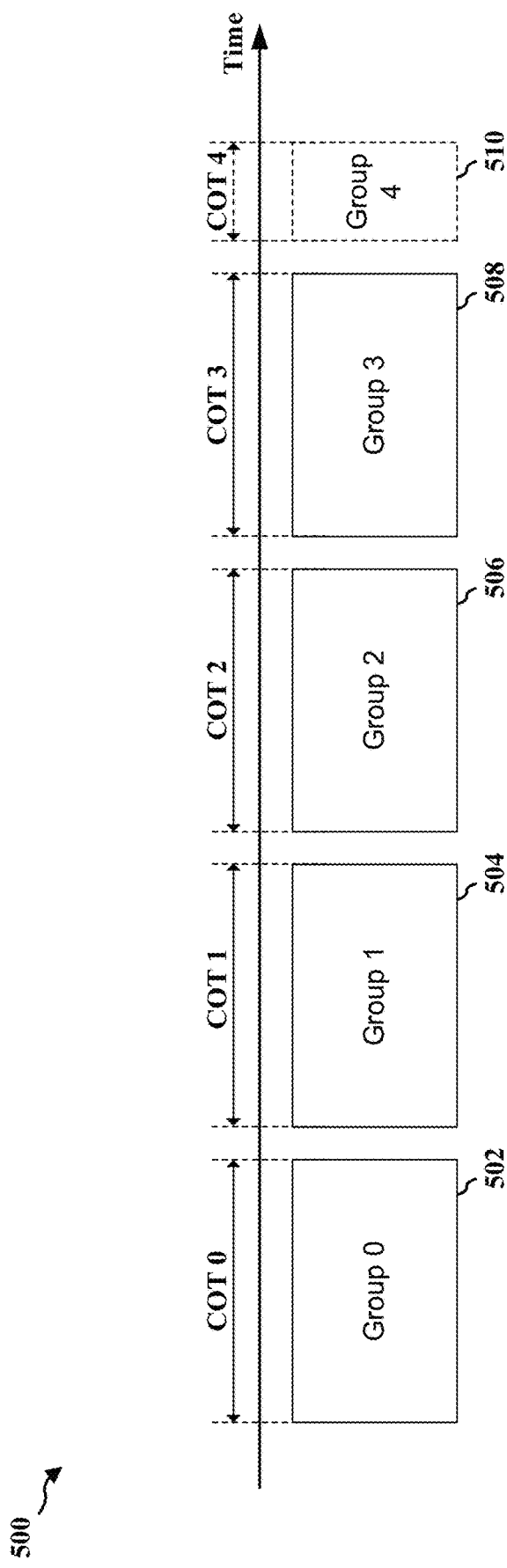
FIG. 5 illustrates an example of wireless communication

FIG. 5 illustrates an example 500 of wireless communication showing COTs shared among different groups of UEs. Example 500 may include four (4) super-groups, including group 0 502, group 1 504, group 2 506, and group 3 508, and a smaller group; group 4 510. Each super-group may include a large number of UEs, e.g., 20 UEs, and group 4 510 may have a smaller number of UEs, e.g., 2 UEs, compared to the super-groups. Since the UEs within the groups individually contend for the COT, the groups with more UEs are more likely to clear the CAT 4 LBT and to have access to a COT. The larger groups may then share the group COT with the UEs within their respective groups. As the super-groups have a large number of UEs, the super-groups may have a better chance of clearing the LBT to secure the group COT. The smaller group with fewer UEs is less likely to secure the group COT. Thus, as illustrated in FIG. 5, group 0 502 may secure and share COT 0, group 1 504 may secure and share COT 1, group 2 506 may secure and share COT 2, and group 3 508 may secure and share COT 4. The smaller group of UEs in group 4 510 may continue to be unsuccessful in clearing CCA as they contend with larger groups of UEs. That may leave group 4 510 without access to wireless resources in an ongoing manner. For example, groups 0-3 may time-division multiplex (TDM) their group COTs in a back-to-back manner without providing an opportunity for group 4 510 to access the medium until the UEs in groups 0-3 have finished their transmissions. The delay for the UEs of group 4 510 to access the medium in order to transmit sidelink transmissions may create an unacceptable delay for the sidelink communication. As well, the length of a COT secured by one of groups 0-3 may further impact time-sensitive packets from the UEs in group 4 510.

Referring to example 500, the group 0 502, the group 1 504, the group 2 506, and the group 3 508 may secure the COTs consecutively back to back. That is, one of the UEs of the group 0 502 may first clear the CAT 4 LBT and share COT 0 for the UEs within the group 0 502. The UEs within the group 0 502 may contend for the time/frequency resource within the group 0 502 with CAT 1 or CAT 2 LBT. After the COT 0, one of the UEs of the group 1 504 may clear the CAT 4 LBT and share COT 1 for the UEs within the group 1 504. The UEs within the group 1 504 may contend for the time/frequency resource within the group 1 504 with CAT 1 or CAT 2 LBT. After the COT 1, one of the UEs of the group 2 506 may clear the CAT 4 LBT and share COT 2 for the UEs of the group 2 506. The UEs within the group 2 506 may contend for the time/frequency resource within the group 2 506 with CAT 1 or CAT 2 LBT. After the COT 2, one of the UEs of the group 3 508 may first clear the CAT 4 LBT and share COT 3 for the UEs of the group 3 508. The UEs within the group 3 508 may contend for the time/frequency resource within the group 3 508 with CAT 1 or CAT 2 LBT. The group 4 510 with a smaller number of UE may need to wait for the group 0-3 to finish their transmission before the group 4 510 may clear the CAT 4 LBT to secure the COT 4. In other examples, the UEs in group 4 510 may continue to be unsuccessful in accessing resources for sidelink transmission. However, this may not cause an unacceptable delay for the time-sensitive data or control signaling for the group 4 510.

In some aspects, the group COT may be configured for a long time period, e.g., 6 ms, and the group COT may be configured to include reserved resources and let the UEs outside the UE group to contend for the reserved resources using LBT of a different category. That is, the group COT may be configured to include the reserved resources, the UEs within the UE group may contend for the reserved resources using the CAT 1 or CAT 2 LBT, and UEs outside the UE group may contend for the reserved resources using the CAT 4 LBT. Accordingly, the UEs of other groups may not be able to deliver the time-sensitive packets with CAT 4 LBT within the UE group, and rely on the CAT 4 LBT and contend with CAT 2 LBT in the group COT. Aspects presented herein enable the group COT sharing scheme to further allow other UEs from outside of a group to share at least a portion of the resources of the group COT.

In some aspects, an inter-group COT sharing may be introduced to address the low latency signaling/traffic. The SCI may include new COT-SI signaling fields to enable the inter-group COT sharing.

Figure 6:
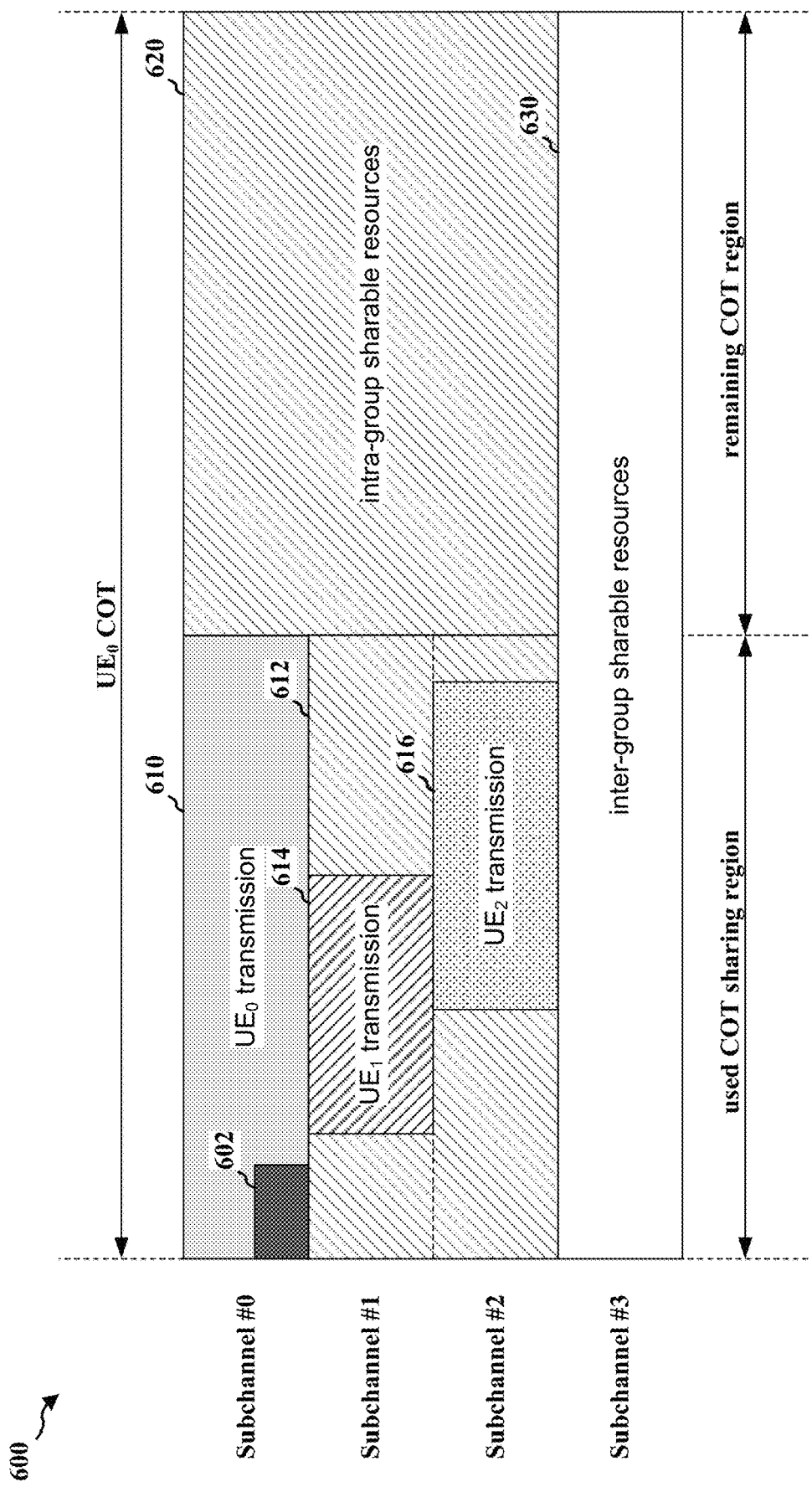
FIG. 6 illustrates example time/frequency resource structure of wireless communication.

FIG. 6 illustrates example time/frequency resource structure 600 of wireless communication. The example time/frequency resource structure 600 illustrates the shared COT 600 cleared by a first UE ($UE_0$) for a first UE group, including $UE_0$, a second UE ($UE_1$), and the third UE ($UE_2$). The example time/frequency resource structure 600 may include $UE_0$ transmission resources 610 and first intra-group sharable resources 620.

$UE_0$ may clear the CAT 4 LBT for the first UE group and secure the COT for the first UE group. The $UE_0$ may determine the $UE_0$ transmission resources 610 to communicate the data transmission and configure the $UE_0$ transmission resources 610 and the reserved resources 620. $UE_0$ may use subchannel #0 in the used COT sharing region to communicate the $UE_0$ transmission and configure subchannel #1 614 and subchannel #2 616 in the used COT as second intra-group sharable resources 612 reserved for the UEs of the first UE group. $UE_0$ may transmit the SCI 602, indicating the configuration of the shared COT 600. $UE_1$ and $UE_2$ of the first UE group may receive the SCI 602 and determine to communicate data transmission within the used COT sharing region. $UE_1$ and $UE_2$ may contend for the time/frequency resources using the CAT 1 or CAT 2 LBT. In one aspect, under the CAT 1 LBT, the SCI 602 may allocate the $UE_1$ transmission and the $UE_2$ transmission for the $UE_1$ and the $UE_2$. In one aspect, $UE_1$ may contend for the time/frequency resources using the CAT 2 LBT and secure $UE_1$ transmission resources 614 for the $UE_1$ data transmission within the second intra-group sharable resources 612. $UE_2$ may contend for the time/frequency resource using the CAT 2 LBT and secure $UE_2$ transmission resources 616 for the $UE_2$ data transmission within the second intra-group sharable resources 612.

The UEs of the first UE group may clear the CAT 4 LBT to allocate at least a part of the first intra-group sharable resources 620 and the second intra-group sharable resources 612 to communicate data transmission on the sidelink channel. The UEs outside the first UE group may not access the first intra-group sharable resources 620 and the second intra-group sharable resources 612 of the $UE_0$ COT using the CAT 1 or CAT 2 LBT. The UEs outside the first UE group may attempt to access the first intra-group sharable resources 620 of the $UE_0$ COT and communicate data transmission with the CAT 4 LBT. The initiating UE, which is the $UE_0$, may maintain a contiguous transmission with an optional gap of 16 microseconds (p), and the UEs outside the first UE group may have little chance to clear the CAT 4 if being close to the $UE_0$. Within the intra-group sharable resources 620 of the remaining COT region, the UEs in the first UE group may leave a gap, e.g., one (1) empty slot. Accordingly, the UEs outside the first UE group may still have a chance to access the COT with CAT 4 LBT in the intra-group sharable resources.

However, in the heavily loaded case, the UEs within the first UE group may TDM back-to-back in the remaining COT. The UEs outside the first UE group may not easily clear the CAT4 LBT. Also, if the used COT sharing region is long, e.g., 4 ms, in comparison to time-sensitive data (e.g., associated with a time that is less than 4 ms), the UEs outside of the first group may not be able to access wireless resources to transmit the time-sensitive traffic within the time window for the time-sensitive data.

The COT initiating UE may reserve resources to be used by UEs outside the shared UE group. The COT initiating UE may indicate a set of the resource aside from the non-sharable resources and group sharable resources for out-of-group UE to join. That is, $UE_0$ may configure the inter-group sharable resources 630. Referring to the example time/frequency resource structure 600, the $UE_0$ may configure the inter-group sharable resources 630 in subchannel #3. The inter-group sharable resources 630 may overlap in time with the used COT region and the remaining COT region. The UEs outside the shared group may contend for the resources in the inter-group sharable resources with the same type of LBT as the UEs within the shared group. For example, UEs outside the shared group may contend for the resources in the inter-group sharable resources with the CAT 1 or CAT 2 LBT.

In some aspects, The size of the inter-group sharable resources 630 may be configured to accommodate the high priority and/or time-sensitive data transmissions for the UEs outside the shared UE group. As any UE may access the inter-group sharable resources, a heavy collision may occur in the inter-group sharable resources for the out-of-group UEs. UE0 may configure some access control to reduce the heavy collision of data transmissions.

In some aspects, the out-of-group UEs may join the COT on the inter-group sharable resources 630 for out-of-group UE if the priority is higher than a threshold priority value or the remaining packet delay budget (PDB) is less than a threshold PDB value. The threshold priority value and the threshold PDB value may be preconfigured. The $UE_0$ may configure the threshold priority value and the threshold PDB value. The SCI transmitted by the $UE_0$ may indicate the threshold priority value and the threshold PDB value. Some high priority traffic and the packet running out of PDB may make use of the inter-group sharable resources despite not being in the shared UE group. The restriction on traffic priority and PDB constraint may limit or reduce the collision problem.

In some aspects, COT sharing information (SI) (COT-SI) may include thresholds for the UEs outside the shared UE group. The SCI of the $UE_0$ may include the COT-SI to the SCI. The COT-SI may include the group ID of the shared UE group, and the UEs having the same group ID as specified in COT-SI may use the reserved shared COT resources in the Time/frequency resource grids of the first intra-group sharable resources 620 and the second intra-group sharable resources 612 for the in-the-group UEs in the used COT sharing region and remaining COT region. The COT-SI may also include an On/Off field to allow inter-group sharing. That is, the On/Off field may indicate whether to include the inter-group sharable resources 630.

The COT-SI may include a list of group IDs for inter-group sharing to limit the inter-group sharing to specific groups. That is, the $UE_0$ may determine to limit the access to the inter-group sharable resources 630 to a list of specific groups, and the COT-SI may include the list of group IDs of the specific groups allowed to access the inter-group sharable resources 630.

The COT-SI may indicate the time/frequency resource grid of the inter-group sharable resources 630 for the rest of UEs outside the shared UE group and/or the specific groups indicated in the COT-SI.

Priority threshold or PDB threshold for the UE from other/indicated group to join the COT. The out-of-group UEs may access the inter-group sharable resources 630 if the packet is above certain priority threshold or the PDB is almost running out. That is, the UE outside the first UE group may receive the COT-SI in the SCI transmitted by the $UE_0$ indicating the threshold priority value and the threshold PDB value, and determine to contend for the inter-group sharable resources to communicate the data transmissions having a priority greater than the threshold priority value and/or a remaining PDB less than the threshold PDB value.

In some aspects, the size of the inter-group sharable resources 630 may be adjusted based on the usage of the channel to reduce the time-frequency cost to the intra-group sharable resources. Accordingly, the inter-group sharable resources 630 may be scaled up/down based on the usage of the channel. While a group UE is in the RX mode in the shared COT, it may actively listen for the SCI in the sharable resources. The group UE may determine whether the sharable resources are used by UEs from the same group based on the group ID of the SCI. That is, the UEs of the UE group may track whether the sharable resources in the channel are used by the UEs in the shared UE group. The UE may compute the usage ratio on the sharable time/frequency resources and determine whether to scale up/down the inter-group sharable resources. In some aspects, the inter-group sharable resources may be scaled up for the next acquired group COT in response to the usage ratio being above a certain threshold value. The inter-group sharable resources may be scaled down for the next acquired group COT if the usage ratio is below the certain threshold value.

Figure 7:
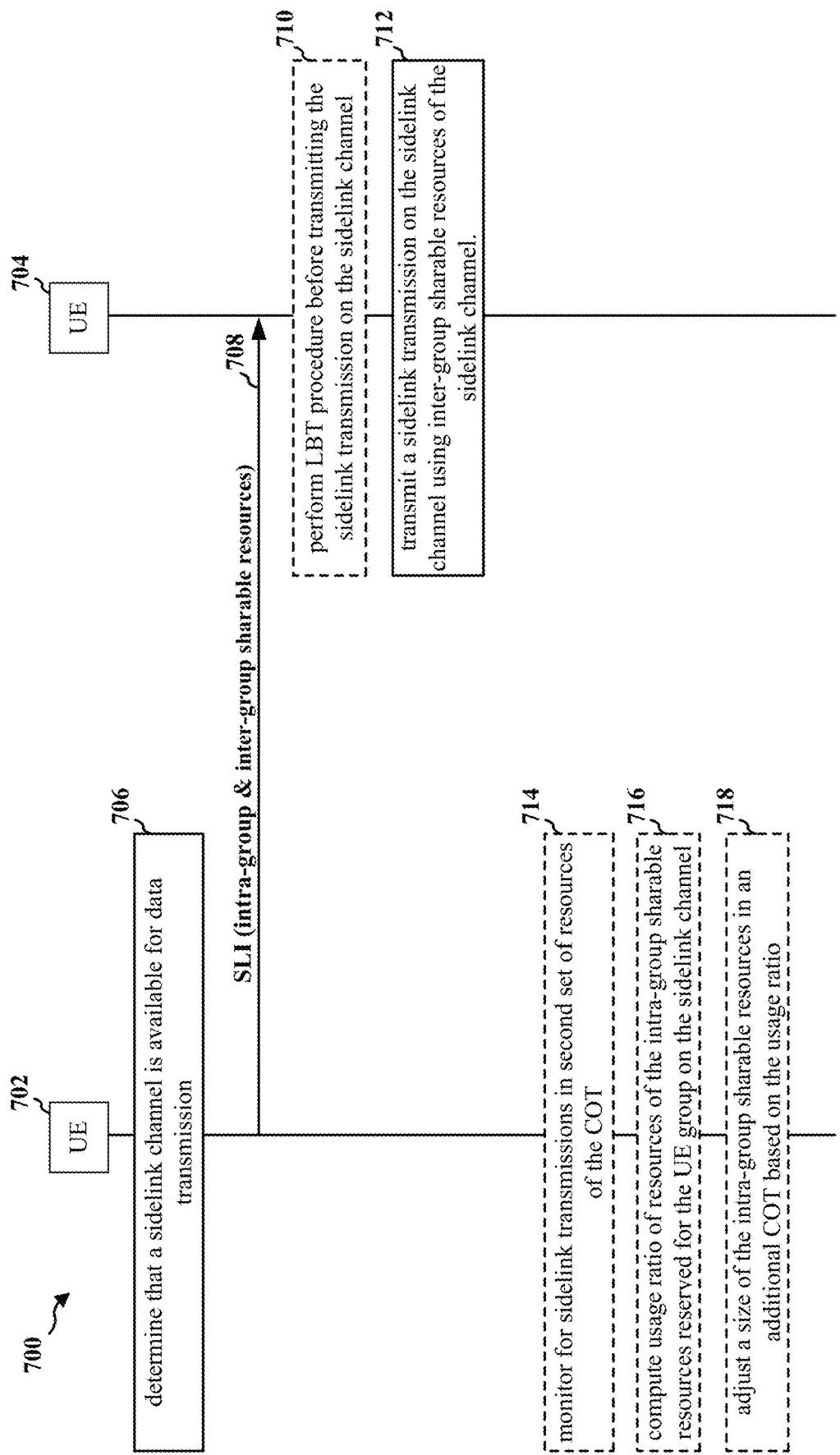
FIG. 7 illustrates a call-flow diagram of a method of wireless communication.

FIG. 7 illustrates a call-flow diagram 700 of a method of wireless communication. The call-flow diagram 700 may include a first UE 702 within a UE group, and a second UE 704 outside the UE group.

At 706, the first UE 702 may determine that a sidelink channel is available for data transmission. The first UE 702 may determine that the sidelink channel is available for the data transmission based on an LBT procedure. In one aspect, the first UE 702 may determine that the sidelink channel is available for the data transmission by performing a CAT 4 LBT procedure.

At 708, the first UE 702 may transmit SCI reserving a COT on the sidelink channel in response to determining that the sidelink channel is available for data transmission, and the second UE 704 may receive, from the first UE 702, the SCI reserving a COT on a sidelink channel.

The COT may include a first set of resources reserved for the first UE 702 for sidelink data transmission on the sidelink channel, a second set of resources as an intra-group sharable resources capable of being shared by the UE group including the first UE 702 for sidelink transmission on the sidelink channel, and a third set of resources as an inter-group sharable resources capable of being shared by one or more UEs outside of the UE group for the sidelink transmission on the sidelink channel.

The intra-group sharable resources may be shared by the UE group including the first UE 702. The UE group may contend for the intra-group sharable resources based on a first type of LBT procedure. The first type of LBT procedure may include a CAT 1 or CAT 2 LBT procedure. The one or more UEs outside of the UE group may contend for the intra-group sharable resources based on a second type of LBT procedure. The second type of LBT procedure may include a CAT 4 LBT procedure.

The inter-group sharable resources are reserved for sharing with the one or more UEs outside of the UE group. In one aspect, the SCI may indicate the inter-group sharable resources of the COT on the sidelink channel that are capable of being shared by the one or more UEs outside of the UE group. In another aspect, the SCI may indicate the first set of resources and the intra-group sharable resources of the COT on the sidelink channel, and the inter-group sharable resources may include the remaining resources of the COT. The inter-group sharable resources may overlap in time with the first set of resources, and at least a part of the inter-group sharable resources may not overlap in time with the first set of resources.

The SCI may indicate a priority threshold value for use of the inter-group sharable resources by the one or more UEs outside of the UE group. The SCI may indicate a PDB threshold value for use of the inter-group sharable resources by the one or more UEs outside of the UE group. The SCI may include a group ID identifying the UE group. The SCI may include a field that indicates whether inter-group sharing is allowed. The SCI may include a list of one or more group IDs for additional UE groups for inter-group sharing of the third set of resources.

At 710, the second UE 704 may perform the LBT procedure before transmitting the sidelink transmission on the sidelink channel using the one or more resources of the intra-group sharable resources or the inter-group sharable resources.

At 712, the second UE 704 may transmit a sidelink transmission on the sidelink channel using one or more resources of the inter-group sharable resources. The second UE 704 may transmit the sidelink transmission on the sidelink channel using the one or more resources of the inter-group sharable resources based on a priority of the sidelink transmission meeting the priority threshold value indicated in the SCI received at 708. The second UE 704 may transmit the sidelink transmission on the sidelink channel using the one or more resources of the inter-group sharable resources based on a PDB at the first UE 702 meeting the PDB threshold value indicated in the SCI received at 708. The second UE 704 may transmit the sidelink transmission on the sidelink channel using the one or more resources of the inter-group sharable resources based on the second UE 704 being a part of the additional UE groups for inter-group sharing indicated in the SCI received at 708.

At 714, the first UE 702 may monitor for sidelink transmissions in the intra-group sharable resources of the COT. At 716, the first UE 702 may compute a usage ratio of resources of the intra-group sharable resources reserved for the UE group on the sidelink channel.

At 718, the first UE 702 may adjust a size of the intra-group sharable resources in an additional COT based on the usage ratio. The first UE 702 may increase the size of the intra-group sharable resources in response to the computed usage ratio being greater than or equal to a usage threshold value. The first UE 702 may decrease the size of the intra-group sharable resources in response to the computed usage ratio being smaller than a usage threshold value.

Figure 8:
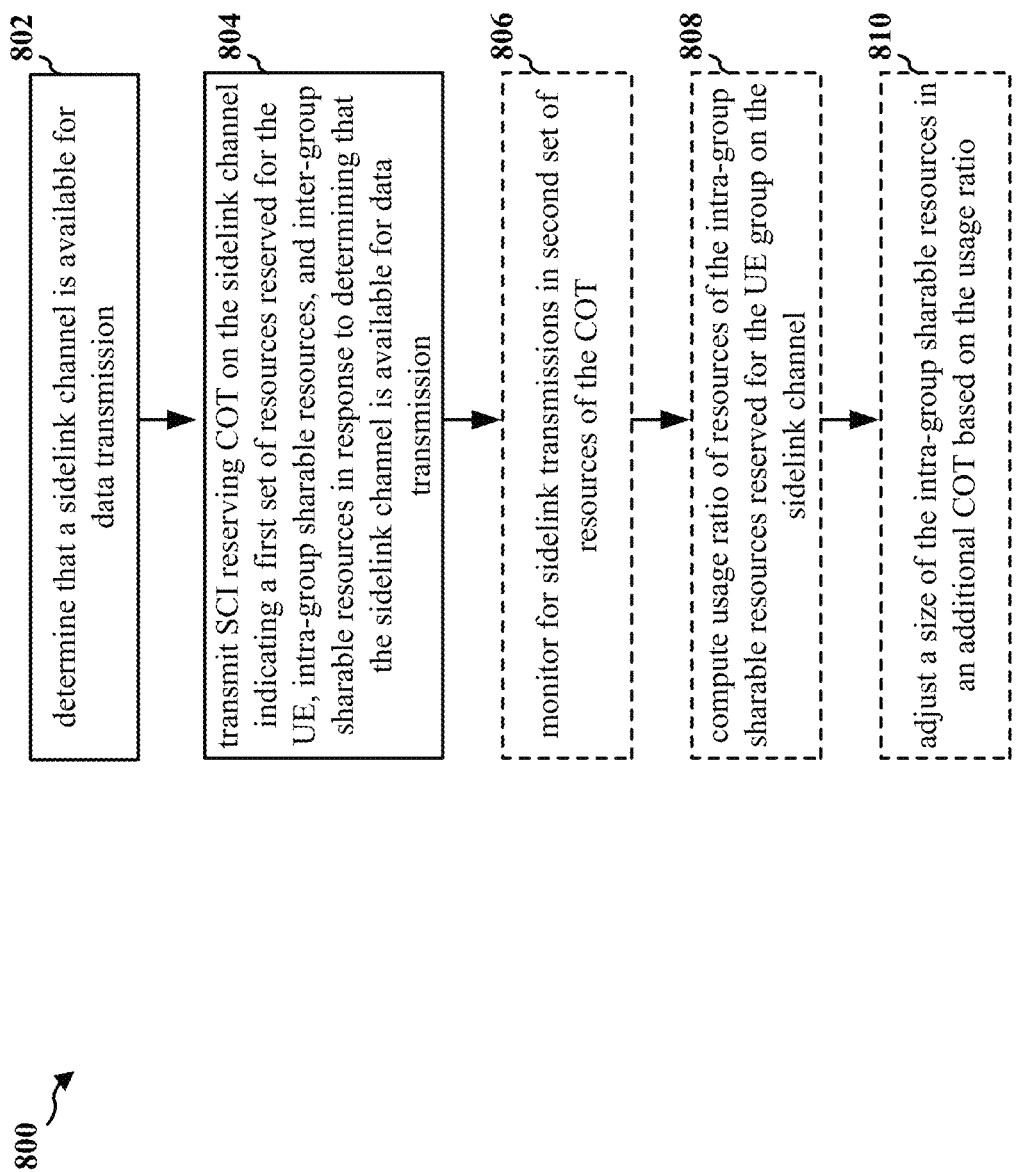
FIG. 8 is a flowchart of a method of wireless communication.

FIG. 8 is a flowchart 800 of a method of wireless communication. The method may be performed by a UE included in a UE group (e.g., the UE 104; the first UE 702; the apparatus 1002).

At 802, the UE may be configured to determine that a sidelink channel is available for data transmission (i.e., as at 706). The UE may determine that the sidelink channel is available for the data transmission based on an LBT procedure. In one aspect, the UE may determine that the sidelink channel is available for the data transmission by performing a CAT 4 LBT procedure. For example, 802 may be performed by an LBT component 1042.

At 804, the UE may be configured to transmit SCI reserving a COT on the sidelink channel in response to determining that the sidelink channel is available for data transmission (i.e., as at 708). The COT may include a first set of resources reserved for the UE for sidelink data transmission on the sidelink channel, a second set of resources as an intra-group sharable resources capable of being shared by the UE group including the UE for sidelink transmission on the sidelink channel, and a third set of resources as an inter-group sharable resources capable of being shared by one or more UEs outside of the UE group for the sidelink transmission on the sidelink channel. The intra-group sharable resources may be shared by the UE group including the UE. The UE group may contend for the intra-group sharable resources based on a first type of LBT procedure. The first type of LBT procedure may include a CAT 1 or CAT 2 LBT procedure. The one or more UEs outside of the UE group may contend for the intra-group sharable resources based on a second type of LBT procedure. The second type of LBT procedure may include a CAT 4 LBT procedure. The inter-group sharable resources may be reserved for sharing with the one or more UEs outside of the UE group. The one or more UEs outside of the UE group may contend for the inter-group sharable resources based on the first type of LBT procedure including the CAT 1 or CAT 2 LBT procedure. In one aspect, the SCI may indicate the inter-group sharable resources of the COT on the sidelink channel that may be capable of being shared by the one or more UEs outside of the UE group. In another aspect, the SCI may indicate the first set of resources and the intra-group sharable resources of the COT on the sidelink channel, and the inter-group sharable resources may include the remaining resources of the COT. The inter-group sharable resources may overlap in time with the first set of resources, and at least a part of the inter-group sharable resources may not overlap in time with the first set of resources. The SCI may indicate a priority threshold value for use of the inter-group sharable resources by the one or more UEs outside of the UE group. The SCI may indicate a PDB threshold value for use of the inter-group sharable resources by the one or more UEs outside of the UE group. The SCI may include a group ID identifying the UE group. The SCI may include a field that indicates whether inter-group sharing is allowed. The SCI may include a list of one or more group IDs for additional UE groups for inter-group sharing of the third set of resources. For example, 804 may be performed by a group resource sharing component 1040.

At 806, the UE may be configured to monitor for sidelink transmissions in the intra-group sharable resources of the COT (i.e., as at 714). For example, 806 may be performed by the group resource sharing component 1040.

At 808, the UE may be configured to compute a usage ratio of resources of the intra-group sharable resources reserved for the UE group on the sidelink channel (i.e., as at 716). For example, 808 may be performed by the group resource sharing component 1040.

At 810, the UE may be configured to adjust a size of the intra-group sharable resources in an additional COT based on the usage ratio (i.e., as at 718). The UE may increase the size of the intra-group sharable resources in response to the computed usage ratio being greater than or equal to a usage threshold value. The UE may decrease the size of the intra-group sharable resources in response to the computed usage ratio being smaller than a usage threshold value. For example, 810 may be performed by the group resource sharing component 1040.

Figure 9:
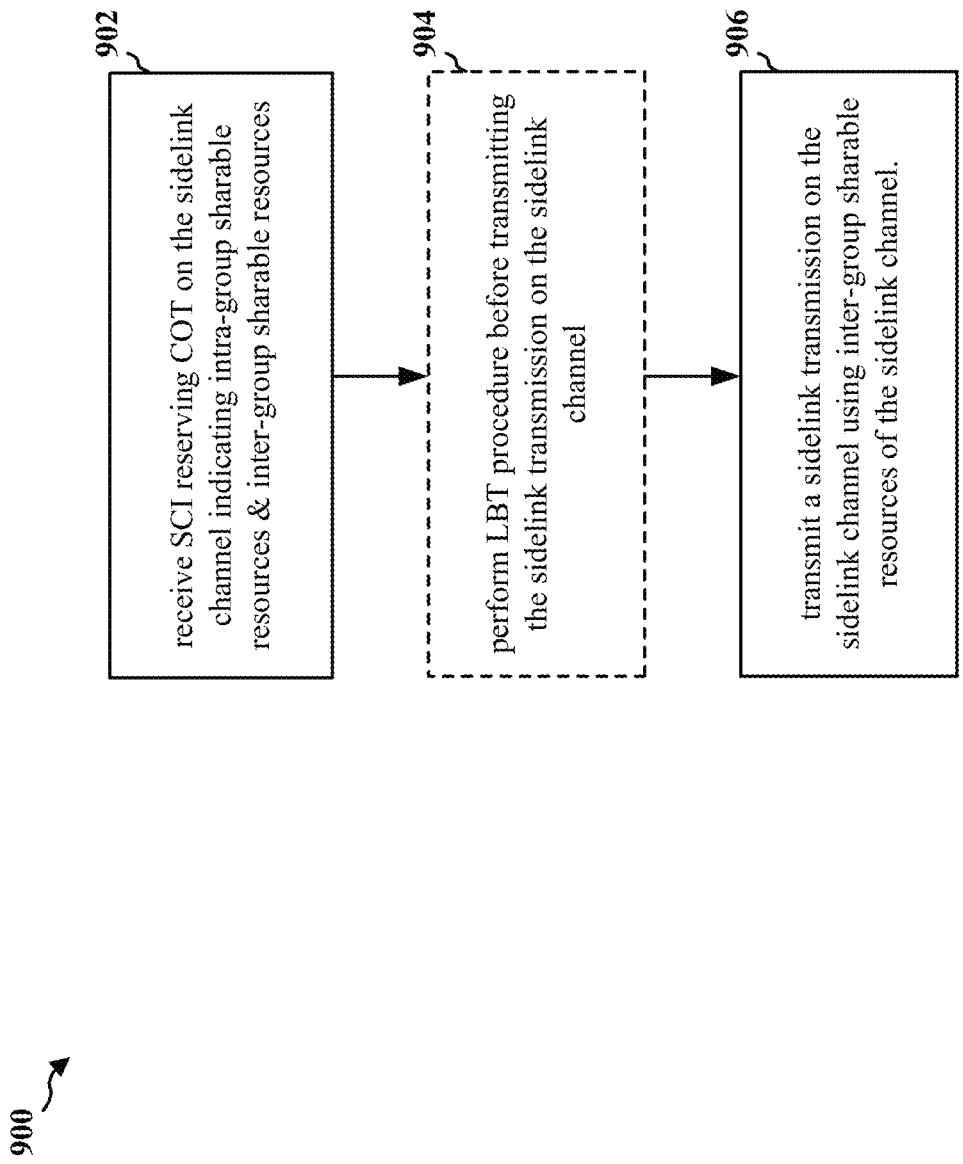
FIG. 9 is a flowchart of a method of wireless communication.

FIG. 9 is a flowchart 900 of a method of wireless communication. The method may be performed by a UE outside a UE group (e.g., the UE 104; the second UE 704; the apparatus 1002).

At 902, the UE outside a UE group may be configured to receive SCI reserving a COT on the sidelink channel from another UE of the UE group (i.e., as at 708). The COT may include a first set of resources as an intra-group sharable resources capable of being shared by the UE group including the UE for sidelink transmission on the sidelink channel, and a second set of resources as an inter-group sharable resources capable of being shared by one or more UEs outside of the UE group for the sidelink transmission on the sidelink channel. The UE outside of the UE group may contend for the intra-group sharable resources based on a second type of LBT procedure including a CAT 4 LBT procedure. The inter-group sharable resources may be reserved for sharing with the UE outside of the UE group. The UE outside of the UE group may contend for the inter-group sharable resource based on a first type of LBT procedure including the CAT 1 or CAT 2 LBT procedure. The SCI may indicate the inter-group sharable resources of the COT on the sidelink channel that may be capable of being shared by the UE outside of the UE group. The inter-group sharable resources may overlap in time with the inter-group sharable resources. The SCI may indicate a priority threshold value for use of the inter-group sharable resources by the one or more UEs outside of the UE group. The SCI may indicate a PDB threshold value for use of the inter-group sharable resources by the one or more UEs outside of the UE group. The SCI may include a group ID identifying the UE group. The SCI may include a field that indicates whether inter-group sharing is allowed. The SCI may include a list of one or more group IDs for additional UE groups for inter-group sharing of the third set of resources. For example, 804 may be performed by a group resource sharing component 1040.

At 904, the UE may be configured to perform the LBT procedure before transmitting the sidelink transmission on the sidelink channel using the one or more resources of the intra-group sharable resources or the inter-group sharable resources (i.e., as at 710). The UE outside of the UE group may contend for the intra-group sharable resources based on a second type of LBT procedure including the CAT 4 LBT procedure. The UE outside of the UE group may contend for the inter-group sharable resource based on a first type of LBT procedure including the CAT 1 or CAT 2 LBT procedure. For example, 904 may be performed by an LBT component 1042.

At 906, the UE may be configured to transmit a sidelink transmission on the sidelink channel using one or more resources of the inter-group sharable resources (i.e., as at 712). The UE may transmit the sidelink transmission on the sidelink channel using the one or more resources of the inter-group sharable resources based on a priority of the sidelink transmission meeting the priority threshold value indicated in the SCI received at 902. The UE may transmit the sidelink transmission on the sidelink channel using the one or more resources of the inter-group sharable resources based on a PDB at the first UE meeting the PDB threshold value indicated in the SCI received at 902. The UE may transmit the sidelink transmission on the sidelink channel using the one or more resources of the inter-group sharable resources based on the UE being a part of the additional UE groups for inter-group sharing indicated in the SCI received at 902. For example, 906 may be performed by the group resource sharing component 1040.

Figure 10:
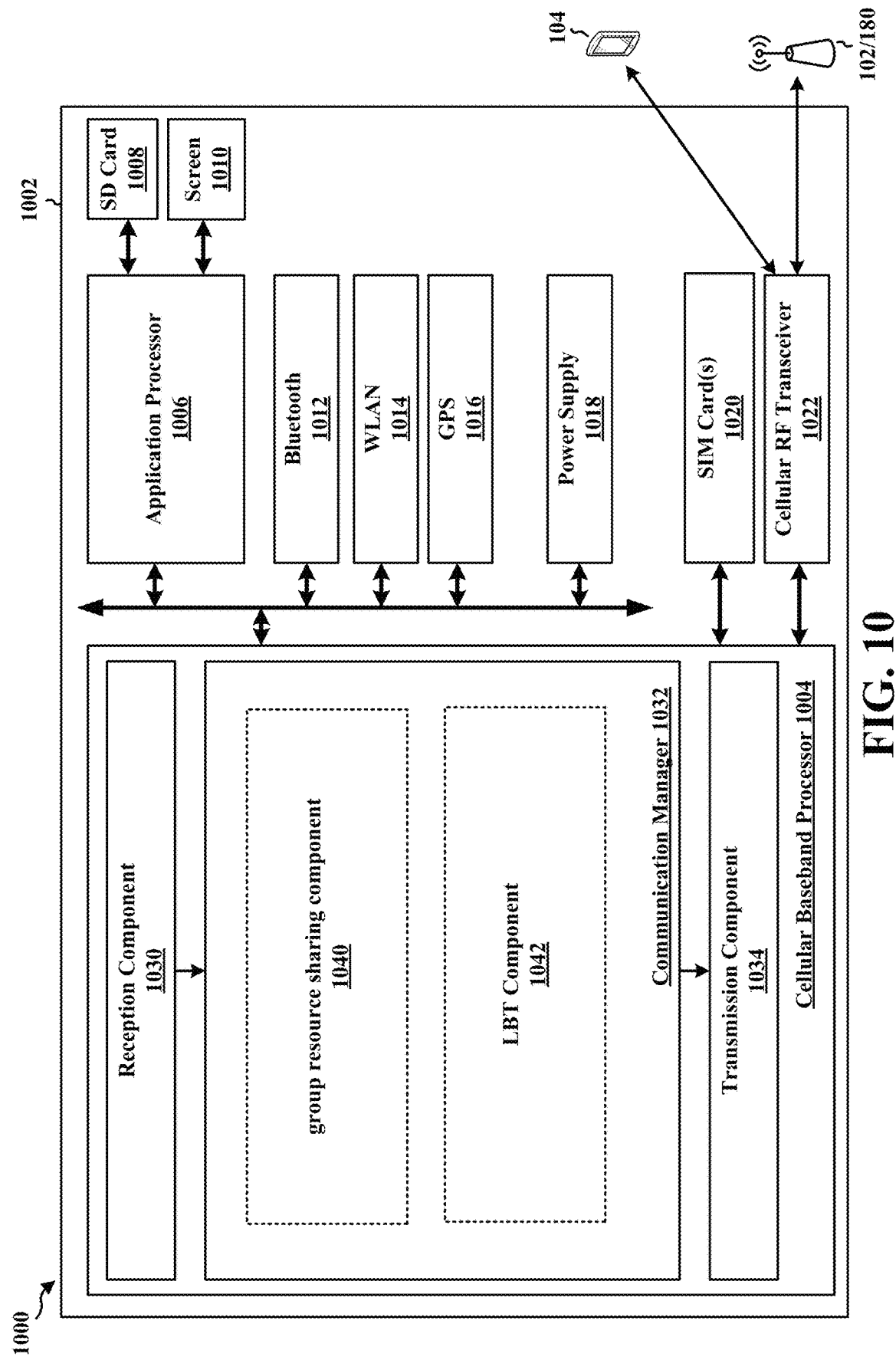
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a group resource sharing component 1040 that is configured to transmit and receive SCI reserving a COT on the sidelink channel in response to determining that the sidelink channel is available for data transmission, monitor for sidelink transmissions in the intra-group sharable resources of the COT, compute a usage ratio of resources of the intra-group sharable resources reserved for the UE group on the sidelink channel, adjust a size of the intra-group sharable resources in an additional COT based on the usage ratio, and transmit a sidelink transmission on the sidelink channel using one or more resources of the inter-group sharable resources, e.g., as described in connection with 804, 806, 808, 810, 902, and 906. The communication manager 1032 further includes an LBT component 1042 that is configured to determine that a sidelink channel is available for data transmission, and perform the LBT procedure before transmitting the sidelink transmission on the sidelink channel using the one or more resources of the intra-group sharable resources or the inter-group sharable resources, e.g., as described in connection with 802 and 904. The 1040 and 1042 are configured to communicate with each other.

The apparatus may include additional components that perform each of the blocks of the algorithm in the aforementioned flowcharts of FIGS. 7, 8, and 9. As such, each block in the aforementioned flowcharts of FIGS. 7, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for determining that a sidelink channel is available for data transmission, and means for transmitting SCI reserving a COT on the sidelink channel in response to determining that the sidelink channel is available for data transmission. The apparatus 1002 includes means for monitoring for sidelink transmissions in the second set of resources of the COT, means for computing a usage ratio of resources of the second set of resources reserved for the UE group on the sidelink channel, and means for adjusting the size of the second set of resources in an additional COT based on the usage ratio, including means for increasing the size of the second set of resources in response to the computed usage ratio being greater than or equal to a usage threshold value and means for decreasing the size of the second set of resources in response to the computed usage ratio being smaller than a usage threshold value. The apparatus 1002 includes means for receiving, from a second UE, SCI reserving a COT on a sidelink channel, and means for transmitting a sidelink transmission on the sidelink channel using one or more resources of the second set of resources. The apparatus 1002 includes means for performing an LBT procedure before transmitting the sidelink transmission on the sidelink channel using the one or more resources of the first set of resources or the second set of resources. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Referring again to FIGS. 5, 6, 7, 8, 9, and 10, the wireless communication may include a first UE included in a UE group and a second UE outside of the UE group. The first UE may determine that a sidelink channel is available for data transmission and transmit SCI reserving a COT on the sidelink channel in response to determining that the sidelink channel is available for data transmission. The COT may include a first set of resources reserved for the first UE for sidelink data transmission on the sidelink channel, a second set of resources as an intra-group sharable resources capable of being shared by the UE group including the first UE for sidelink transmission on the sidelink channel, and a third set of resources as an inter-group sharable resources capable of being shared by the second UE outside of the UE group for the sidelink transmission on the sidelink channel.

The first UE may determine that the sidelink channel is available for the data transmission based on an LBT procedure. The first UE may determine that the sidelink channel is available for the data transmission by performing a CAT 4 LBT procedure.

The inter-group sharable resources may be reserved for sharing with the second UE outside of the UE group. The SCI may indicate the inter-group sharable resources of the COT on the sidelink channel that are capable of being shared by the second UE outside of the UE group.

The inter-group sharable resources may overlap in time with the first set of resources, and the inter-group sharable resources may include resources that do not overlap in time with the first set of resources.

A first UE within the UE group may contend for the intra-group sharable resources based on a first type of LBT procedure and a second UE outside the UE group may contend for the intra-group sharable resources based on a second type of LBT procedure, where the first type of LBT procedure may include a CAT 1 or CAT 2 LBT procedure and the second type of LBT procedure may include a CAT 4 LBT procedure.

The SCI may indicate the first set of resources and the intra-group sharable resources of the COT on the sidelink channel, where the inter-group sharable resources may include remaining resources of the COT. The SCI may indicate a priority threshold value for use of the inter-group sharable resources by the second UE outside of the UE group. The SCI may indicate a PDB threshold value for use of the inter-group sharable resources by the second UE outside of the UE group. The SCI may include a group ID identifying the UE group. The SCI may include a field that may indicate whether inter-group sharing is allowed. The SCI may include a list of one or more group IDs for additional UE groups for inter-group sharing of the inter-group sharable resources.

The first UE may monitor for sidelink transmissions in the intra-group sharable resources of the COT, compute a usage ratio of resources of the intra-group sharable resources reserved for the UE group on the sidelink channel, and adjust a size of the intra-group sharable resources in an additional COT based on the usage ratio. The size of the intra-group sharable resources may be adjusted by increasing the size of the intra-group sharable resources in response to the computed usage ratio being greater than or equal to a usage threshold value, or decreasing the size of the intra-group sharable resources in response to the computed usage ratio being smaller than a usage threshold value.

The second UE may receive, from the first UE, the SCI reserving the COT on the sidelink channel, the COT including the intra-group sharable resources capable of being shared by the UE group that includes the first UE and does not include the second UE, and the inter-group sharable resources capable of being shared by the UE outside of the UE group for sidelink transmissions on the sidelink channel, and transmitting a sidelink transmission on the sidelink channel using one or more resources of the inter-group sharable resources.

The second UE may perform an LBT procedure before transmitting the sidelink transmission on the sidelink channel using the one or more resources of the intra-group sharable resources or the inter-group sharable resources. The second UE may contend for the intra-group sharable resources based on a different type of LBT procedure than the UE group uses to contend for the intra-group sharable resources. The second UE may also contend for the inter-group sharable resources based on the same type of LBT procedure as the UE group uses to contend for the intra-group sharable resources.

When the SCI indicates a priority threshold value, the second UE may transmit the sidelink transmission on the sidelink channel using the one or more resources of the inter-group sharable resources based on a priority of the sidelink transmission meeting the priority threshold value. When the SCI indicates a PDB threshold value, the second UE may transmit the sidelink transmission on the sidelink channel using the one or more resources of the inter-group sharable resources based on a PDB at the second UE meeting the PDB threshold value. When the SCI includes a list of one or more group IDs for additional UE groups for inter-group sharing of the inter-group sharable resources, the second UE may transmit the sidelink transmission on the sidelink channel using the one or more resources of the inter-group sharable resources based on the second UE being a part of one of the additional UE groups.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Aspect 1 is a method of wireless communication of a UE, the method including determining that a sidelink channel is available for data transmission and transmitting sidelink control information (SCI) reserving a channel occupancy time (COT) on the sidelink channel in response to determining that the sidelink channel is available for data transmission, the COT including a first set of resources reserved for the UE for sidelink data transmission on the sidelink channel, a second set of resources capable of being shared by a UE group including the UE for sidelink transmission on the sidelink channel, and a third set of resources capable of being shared by one or more UEs outside of the UE group for the sidelink transmission on the sidelink channel.

Aspect 2 is the method of aspect 1, wherein the third set of resources are reserved for sharing with the one or more UEs outside of the UE group.

Aspect 3 is the method of any of aspects 1 and 2, wherein the SCI indicates the third set of resources of the COT on the sidelink channel that are capable of being shared by the one or more UEs outside of the UE group.

Aspect 4 is the method of any of aspects 1 and 2, wherein the SCI indicates the first set of resources and the second set of resources of the COT on the sidelink channel, wherein the third set of resources includes remaining resources of the COT.

Aspect 5 is the method of any of aspects 1 to 4, wherein the third set of resources overlaps in time with the first set of resources.

Aspect 6 is the method of any of aspects 1 to 5, wherein the third set of resources includes resources that do not overlap in time with the first set of resources.

Aspect 7 is the method of any of aspects 1 to 6, wherein the UE determines that the sidelink channel is available for the data transmission based on a listen-before-talk (LBT) procedure.

Aspect 8 is the method of aspect 7, wherein the UE determines that the sidelink channel is available for the data transmission by performing a CAT 4 LBT procedure.

Aspect 9 is the method of any of aspects 1 to 8, wherein a first UE within the UE group contends for the second set of resources based on a first type of LBT procedure and a second UE outside the UE group contends for the second set of resources based on a second type of LBT procedure.

Aspect 10 is the method of aspect 9, wherein the first type of LBT procedure includes a CAT 1 or CAT 2 LBT procedure and the second type of LBT procedure includes a CAT 4 LBT procedure.

Aspect 11 is the method of any of aspects 1 to 10, wherein the SCI indicates a priority threshold value for use of the third set of resources by the one or more UEs outside of the UE group.

Aspect 12 is the method of any of aspects 1 to 11, where the SCI indicates a packet delay budget (PDB) threshold value for use of the third set of resources by the one or more UEs outside of the UE group.

Aspect 13 is the method of any of aspects 1 to 12, where the SCI includes a group identifier (ID) identifying the UE group.

Aspect 14 is the method of any of aspects 1 to 13, where the SCI includes a field that indicates whether inter-group sharing is allowed.

Aspect 15 is the method of any of aspects 1 to 14, where the SCI includes a list of one or more group IDs for additional UE groups for inter-group sharing of the third set of resources.

Aspect 16 is the method of any of aspects 1 to 15, further including monitoring for sidelink transmissions in the second set of resources of the COT, computing a usage ratio of resources of the second set of resources reserved for the UE group on the sidelink channel, and adjusting a size of the second set of resources in an additional COT based on the usage ratio.

Aspect 17 is the method of aspect 16, where adjusting the size of the second set of resources includes increasing the size of the second set of resources in response to the computed usage ratio being greater than or equal to a usage threshold value.

Aspect 18 is the method of any of aspects 16 and 17, where adjusting the size of the second set of resources includes decreasing the size of the second set of resources in response to the computed usage ratio being smaller than a usage threshold value.

Aspect 19 is an apparatus for wireless communication including at least one processor coupled to a memory and configured to implement a method as in any of aspects 1 to 18.

Aspect 20 is an apparatus for wireless communication including means for implementing a method as in any of aspects 1 to 18.

Aspect 21 is a computer-readable medium storing computer-executable code, where the code when executed by a processor causes the processor to implement a method as in any of aspects 1 to 18.

Aspect 22 is a method of wireless communication of a UE, the method including: receiving, from a second UE, SCI reserving a COT on a sidelink channel, the COT including a first set of resources capable of being shared by a UE group that includes the second UE and does not include the first UE, and a second set of resources capable of being shared by a UE outside of the UE group for sidelink transmissions on the sidelink channel, and transmitting a sidelink transmission on the sidelink channel using one or more resources of the second set of resources.

Aspect 23 is the method of aspect 22, where the SCI indicates the second set of resources of the COT on the sidelink channel that are capable of being shared outside of the UE group.

Aspect 24 is the method of any of aspects 22 and 23, where the second set of resources overlaps in time with the first set of resources.

Aspect 25 is the method of any of aspects 22 to 24, further including performing an LBT procedure before transmitting the sidelink transmission on the sidelink channel using the one or more resources of the first set of resources or the second set of resources.

Aspect 26 is the method of aspect 25, where the first UE that is outside the UE group contends for the first set of resources based on a different type of LBT procedure than the UE group uses to contend for the first set of resources.

Aspect 27 is the method of any of aspects 25 and 26, where the first UE that is outside the UE group contends for the second set of resources based on a same type of LBT procedure as the UE group uses to contend for the first set of resources.

Aspect 28 is the method of any of aspects 22 to 27, where the SCI indicates a priority threshold value, and the first UE transmits the sidelink transmission on the sidelink channel using the one or more resources of the second set of resources based on a priority of the sidelink transmission meeting the priority threshold value.

Aspect 29 is the method of any of aspects 22 to 28, where the SCI indicates a PDB threshold value, and the first UE transmits the sidelink transmission on the sidelink channel using the one or more resources of the second set of resources based on a PDB at the first UE meeting the PDB threshold value.

Aspect 30 is the method of any of aspects 22 to 29, where the SCI includes a group ID identifying the UE group.

Aspect 31 is the method of any of aspects 22 to 30, where the SCI includes a field that indicates whether inter-group sharing is allowed.

Aspect 32 is the method of any of aspects 22 to 31, where the SCI includes a list of one or more group IDs for additional UE groups for inter-group sharing of the second set of resources, where the first UE transmits the sidelink transmission on the sidelink channel using the one or more resources of the second set of resources based on the first UE being a part of one of the additional UE groups.

Aspect 33 is an apparatus for wireless communication including at least one processor coupled to a memory and configured to implement a method as in any of aspects 22 to 32.

Aspect 34 is an apparatus for wireless communication including means for implementing a method as in any of aspects 22 to 32.

Aspect 35 is a computer-readable medium storing computer-executable code, where the code when executed by a processor causes the processor to implement a method as in any of aspects 22 to 32.

What is claimed is:

1. A method of wireless communication of a user equipment (UE), comprising:
   determining that a sidelink channel is available for data transmission; and
   transmitting sidelink control information (SCI) reserving a channel occupancy time (COT) on the sidelink channel in response to determining that the sidelink channel is available for data transmission, the COT comprising:
   a first set of resources reserved for the UE for sidelink data transmission on the sidelink channel;
   a second set of resources capable of being shared by a UE group including the UE for sidelink transmission on the sidelink channel; and
   a third set of resources capable of being shared by one or more UEs outside of the UE group for the sidelink transmission on the sidelink channel.

2. The method of claim 1, wherein the third set of resources are reserved for sharing with the one or more UEs outside of the UE group.

3. The method of claim 1, wherein the SCI indicates the third set of resources of the COT on the sidelink channel that are capable of being shared by the one or more UEs outside of the UE group.

4. The method of claim 1, wherein the SCI indicates the first set of resources and the second set of resources of the COT on the sidelink channel, wherein the third set of resources comprises remaining resources of the COT.

5. The method of claim 1, wherein the third set of resources overlaps in time with the first set of resources.

6. The method of claim 1, wherein the third set of resources comprises resources that do not overlap in time with the first set of resources.

7. The method of claim 1, wherein determining that the sidelink channel is available for the data transmission based on a listen-before-talk (LBT) procedure.

8. The method of claim 7, wherein determining that the sidelink channel is available for the data transmission by performing a category (CAT) 4 LBT procedure.

9. The method of claim 1, wherein the SCI indicates a priority threshold value for use of the third set of resources by the one or more UEs outside of the UE group.

10. The method of claim 1, wherein the SCI indicates a packet delay budget (PDB) threshold value for use of the third set of resources by the one or more UEs outside of the UE group.

11. The method of claim 1, wherein the SCI includes a group identifier (ID) identifying the UE group.

12. The method of claim 1, wherein the SCI includes a field that indicates whether inter-group sharing is allowed.

13. The method of claim 1, wherein the SCI includes a list of one or more group identifiers (IDs) for additional UE groups for inter-group sharing of the third set of resources.

14. The method of claim 1, further comprising:
   monitoring for sidelink transmissions in the second set of resources of the COT;
   computing a usage ratio of resources of the second set of resources reserved for the UE group on the sidelink channel; and
   adjusting a size of the second set of resources in an additional COT based on the usage ratio.

15. The method of claim 14, wherein adjusting the size of the second set of resources includes:
   increasing the size of the second set of resources in response to the computed usage ratio being greater than or equal to a usage threshold value.

16. The method of claim 14, wherein adjusting the size of the second set of resources includes:
   decreasing the size of the second set of resources in response to the computed usage ratio being smaller than a usage threshold value.

17. An apparatus for wireless communication of a user equipment (UE), comprising:
   memory; and
   at least one processor coupled to the memory and configured to:
   determine that a sidelink channel is available for data transmission; and
   transmit sidelink control information (SCI) reserving a channel occupancy time (COT) on the sidelink channel in response to determining that the sidelink channel is available for data transmission, the COT comprising:
   a first set of resources reserved for the UE for sidelink data transmission on the sidelink channel;
   a second set of resources capable of being shared by a UE group including the UE for sidelink transmission on the sidelink channel; and
   a third set of resources capable of being shared by one or more UEs outside of the UE group for the sidelink transmission on the sidelink channel.

18. The apparatus of claim 17, wherein the third set of resources are reserved for sharing with the one or more UEs outside of the UE group.

19. The apparatus of claim 17, wherein the SCI indicates the third set of resources of the COT on the sidelink channel that are capable of being shared by the one or more UEs outside of the UE group.

20. The apparatus of claim 17, wherein the SCI indicates the first set of resources and the second set of resources of the COT on the sidelink channel, wherein the third set of resources comprises remaining resources of the COT.

21. The apparatus of claim 17, wherein the third set of resources overlaps in time with the first set of resources.

22. The apparatus of claim 17, wherein the third set of resources comprises resources that do not overlap in time with the first set of resources.

23. The apparatus of claim 17, wherein to determine that the sidelink channel is available for the data transmission, the at least one processor is configured to determine that the sidelink channel is available for the data transmission based on a listen-before-talk (LBT) procedure.

24. The apparatus of claim 23, wherein to determine that the sidelink channel is available for the data transmission, the at least one processor is configured to determine that that the sidelink channel is available for the data transmission by performing a category (CAT) 4 LBT procedure.

25. The apparatus of claim 17, wherein the SCI indicates a priority threshold value for use of the third set of resources by the one or more UEs outside of the UE group.

26. The apparatus of claim 17, wherein the SCI indicates a packet delay budget (PDB) threshold value for use of the third set of resources by the one or more UEs outside of the UE group.

27. The apparatus of claim 17, wherein the SCI includes a group identifier (ID) identifying the UE group.

28. The apparatus of claim 17, wherein the SCI includes a field that indicates whether inter-group sharing is allowed.

29. The apparatus of claim 17, wherein the SCI includes a list of one or more group identifiers (IDs) for additional UE groups for inter-group sharing of the third set of resources.

30. The apparatus of claim 17, wherein the at least one processor is further configured to:
monitor for sidelink transmissions in the second set of resources of the COT;
compute a usage ratio of resources of the second set of resources reserved for the UE group on the sidelink channel; and
adjust a size of the second set of resources in an additional COT based on the usage ratio.

31. The apparatus of claim 30, wherein to adjust the size of the second set of resources, the at least one processor is configured to:
increase the size of the second set of resources in response to the computed usage ratio being greater than or equal to a usage threshold value.

32. The apparatus of claim 30, wherein to adjust the size of the second set of resources, the at least one processor is configured to:
decrease the size of the second set of resources in response to the computed usage ratio being smaller than a usage threshold value.

33. An apparatus for wireless communication of a user equipment (UE), comprising:
means for determining that a sidelink channel is available for data transmission; and
means for transmitting sidelink control information (SCI) reserving a channel occupancy time (COT) on the sidelink channel in response to determining that the sidelink channel is available for data transmission, the COT comprising:
a first set of resources reserved for the UE for sidelink data transmission on the sidelink channel;
a second set of resources capable of being shared by a UE group including the UE for sidelink transmission on the sidelink channel; and
a third set of resources capable of being shared by one or more UEs outside of the UE group for the sidelink transmission on the sidelink channel.

34. A non-transitory computer-readable medium storing computer executable code of a user equipment (UE), the code when executed by a processor causes the processor to:
determine that a sidelink channel is available for data transmission; and
transmit sidelink control information (SCI) reserving a channel occupancy time (COT) on the sidelink channel in response to determining that the sidelink channel is available for data transmission, the COT comprising:
a first set of resources reserved for the UE for sidelink data transmission on the sidelink channel;
a second set of resources capable of being shared by a UE group including the UE for sidelink transmission on the sidelink channel; and
a third set of resources capable of being shared by one or more UEs outside of the UE group for the sidelink transmission on the sidelink channel.

35. A method of wireless communication of a first user equipment (UE), comprising:
receiving, from a second UE, sidelink control information (SCI) reserving a channel occupancy time (COT) on a sidelink channel, the COT comprising:
a first set of resources capable of being shared by a UE group that includes the second UE and does not include the first UE, and
a second set of resources capable of being shared by a UE outside of the UE group for sidelink transmissions on the sidelink channel; and
transmitting a sidelink transmission on the sidelink channel using one or more resources of the second set of resources.

36. The method of claim 35, wherein the SCI indicates the second set of resources of the COT on the sidelink channel that are capable of being shared outside of the UE group.

37. The method of claim 35, wherein the second set of resources overlaps in time with the first set of resources.

38. The method of claim 35, further comprising:
performing a listen-before-talk (LBT) procedure before transmitting the sidelink transmission on the sidelink channel using the one or more resources of the first set of resources or the second set of resources.

39. The method of claim 38, further comprising contending for the first set of resources based on a different type of LBT procedure than the UE group uses to contend for the first set of resources.

40. The method of claim 38, further comprising contending for the second set of resources based on a same type of LBT procedure as the UE group uses to contend for the first set of resources.

41. The method of claim 35, wherein the SCI indicates a priority threshold value, and the first UE transmits the sidelink transmission on the sidelink channel using the one or more resources of the second set of resources based on a priority of the sidelink transmission meeting the priority threshold value.

42. The method of claim 35, wherein the SCI indicates a packet delay budget (PDB) threshold value, and the first UE transmits the sidelink transmission on the sidelink channel using the one or more resources of the second set of resources based on a PDB at the first UE meeting the PDB threshold value.

43. The method of claim 35, wherein the SCI includes a group identifier (ID) identifying the UE group.

44. The method of claim 35, wherein the SCI includes a field that indicates whether inter-group sharing is allowed.

45. The method of claim 35, wherein the SCI includes a list of one or more group identifiers (IDs) for additional UE groups for inter-group sharing of the second set of resources, wherein the first UE transmits the sidelink transmission on the sidelink channel using the one or more resources of the second set of resources based on the first UE being a part of one of the additional UE groups.

46. An apparatus for wireless communication of a first user equipment (UE), comprising:
memory; and
at least one processor coupled to the memory and configured to:

receive, from a second UE, sidelink control information (SCI) reserving a channel occupancy time (COT) on a sidelink channel, the COT comprising:

a first set of resources capable of being shared by a UE group that includes the second UE and does not include the first UE, and a second set of resources capable of being shared by a UE outside of the UE group for sidelink transmissions on the sidelink channel; and transmit a sidelink transmission on the sidelink channel using one or more resources of the second set of resources.

47. The apparatus of claim 46, wherein the SCI indicates the second set of resources of the COT on the sidelink channel that are capable of being shared outside of the UE group.

48. The apparatus of claim 46, wherein the second set of resources overlaps in time with the first set of resources.

49. The apparatus of claim 46, wherein the at least one processor is further configured to:

perform a listen-before-talk (LBT) procedure before transmitting the sidelink transmission on the sidelink channel using the one or more resources of the first set of resources or the second set of resources.

50. The apparatus of claim 49, wherein the at least one processor is further configured to contend for the first set of resources based on a different type of LBT procedure than the UE group uses to contend for the first set of resources.

51. The apparatus of claim 49, wherein the at least one processor is further configured to contend for the second set of resources based on a same type of LBT procedure as the UE group uses to contend for the first set of resources.

52. The apparatus of claim 46, wherein the SCI indicates a priority threshold value, and the first UE transmits the sidelink transmission on the sidelink channel using the one or more resources of the second set of resources based on a priority of the sidelink transmission meeting the priority threshold value.

53. The apparatus of claim 46, wherein the SCI indicates a packet delay budget (PDB) threshold value, and the first UE transmits the sidelink transmission on the sidelink channel using the one or more resources of the second set of resources based on a PDB at the first UE meeting the PDB threshold value.

54. The apparatus of claim 46, wherein the SCI includes a group identifier (ID) identifying the UE group.

55. The apparatus of claim 46, wherein the SCI includes a field that indicates whether inter-group sharing is allowed.

56. The apparatus of claim 46, wherein the SCI includes a list of one or more group identifiers (IDs) for additional UE groups for inter-group sharing of the second set of resources, wherein the first UE transmits the sidelink transmission on the sidelink channel using the one or more resources of the second set of resources based on the first UE being a part of one of the additional UE groups.

57. An apparatus for wireless communication of a first user equipment (UE), comprising:

means for receiving, from a second UE, sidelink control information (SCI) reserving a channel occupancy time (COT) on a sidelink channel, the COT comprising:

a first set of resources capable of being shared by a UE group that includes the second UE and does not include the first UE, and a second set of resources capable of being shared by a UE outside of the UE group for sidelink transmissions on the sidelink channel; and means for transmitting a sidelink transmission on the sidelink channel using one or more resources of the second set of resources.

58. A non-transitory computer-readable medium storing computer executable code of a first user equipment (UE), the code when executed by a processor causes the processor to:

receive, from a second UE, sidelink control information (SCI) reserving a channel occupancy time (COT) on a sidelink channel, the COT comprising:

a first set of resources capable of being shared by a UE group that includes the second UE and does not include the first UE, and a second set of resources capable of being shared by a UE outside of the UE group for sidelink transmissions on the sidelink channel; and transmit a sidelink transmission on the sidelink channel using one or more resources of the second set of resources.

* * * * *